United States Patent [19]

Haendle et al.

[11] 4,425,580
[45] Jan. 10, 1984

[54] DIAGNOSTIC X-RAY INSTALLATION FOR PROVIDING SUBTRACTION IMAGES

[75] Inventors: Joerg Haendle, Erlangen; Wolfgang Maass, Nuremberg, both of Fed. Rep. of Germany

[73] Assignee: Siemens Aktiengesellschaft, Berlin & Munich, Fed. Rep. of Germany

[21] Appl. No.: 315,037

[22] Filed: Oct. 26, 1981

[30] Foreign Application Priority Data

Nov. 19, 1980 [DE] Fed. Rep. of Germany ....... 3043703

[51] Int. Cl.³ ............................................. H04N 5/32
[52] U.S. Cl. .................................. 358/111; 128/653; 128/654
[58] Field of Search ................ 128/653, 654; 358/111, 358/167; 364/414; 378/99

[56] References Cited

U.S. PATENT DOCUMENTS 3,974,386  8/1976  Mistretta et al. ..................... 358/111
4,204,225  5/1980  Mistretta ............................... 378/99
4,204,226  5/1980  Mistretta et al. ..................... 358/111
4,212,062  7/1980  Kohno et al. ......................... 364/414
4,335,427  6/1982  Hunt et al. ............................. 378/99

OTHER PUBLICATIONS

Mistretta et al., "An Improved Technique for Enhancing Small Perodic Contrast Changes in Television Fluoroscopy", Optical Engineering, Sep./Oct. 1973, pp. 169–175.

Primary Examiner—Kyle L. Howell
Assistant Examiner—George Yanulis
Attorney, Agent, or Firm—Hill, Van Santen, Steadman & Simpson

[57] ABSTRACT

An exemplary embodiment includes a television pickup installation, image storage circuitry, a difference stage for the subtraction of two chronologically successively obtained image data signals through difference formation and a monitor. An address computer is connected with the output of the difference stage and has outputs connected to the address inputs of the image storage circuitry. The computer alters in a step-wise fashion the allocation of the image point data to be compared in the difference stage (13) until a minimum of the difference formed during the subtraction of two images results.

3 Claims, 3 Drawing Figures

DIAGNOSTIC X-RAY INSTALLATION FOR PROVIDING SUBTRACTION IMAGES

BACKGROUND OF THE INVENTION

The invention relates to a diagnostic x-ray installation comprising a television pickup installation, image storage means, a difference stage for the subtraction of two chronologically successively obtained image signals through difference formation, and a monitor. Subtraction images are required, in particular, in the case of angiography in order to make blood vessels clearly visible which can only be poorly recognized in the normal radiograph, or on which bone structures are superimposed.

In the production of subtraction images, radiographs, which are prepared with contrast medium filling of the respective body region, are stored and subtracted from images which are taken without contrast medium filling. A subtraction of two picture records can proceed by photographic or television-technical means. In the case of the television-technical subtraction predominantly employed today, as storages for the images, either photographic documents which are scanned by television cameras or video image storages are employed.

In the brochure "Subtraskop", Order No. MR 57/1281 of Siemens AG, an x-ray diagnostic installation of the type initially cited is described wherein, serving as image storage means, are two photographic records which are synchronously taken by the television pickup installation; namely, by two television cameras. The image point data of both records are converted into corresponding electric pulses and subtracted from one another in an electronic differential amplifier. The difference image is represented on a monitor and predominantly contains only the representation of the body region filled with contrast medium; in particular, the blood vessels.

In order that similar structures of the television pictures can be cancelled, the pictures must be subtracted in coincidence. The coincident adjustment, in the case of the known apparatus, proceeds by manual adjustment means which effect a displacement of the pictures relative to one another. By means of these adjustment means, the operator must correct the image registration through adjustment of the subtraction images and visual comparison on the monitor. This signifies an undesired additional outlay.

SUMMARY OF THE INVENTION

The invention proceeds from the object of producing an x-ray diagnostic installation of the type initially cited which unburdens the operator from routine tasks and effects, by electronic means, an automatic registration adjustment of two radiographs.

In accordance with the invention this object is achieved in that an address computer is connected with the output of the difference stage, whose outputs are connected to the address inputs of the image storage means, and which address computer alters in step-wise fashion the allocation of the image point data to be compared, respectively, in the difference stage, until a minimum of the difference formed during the subtraction of two images results. Through this address computer, in the presence of two picture records to be subtracted, an automatic registration adjustment takes place which renders possible an optimum subtraction.

It has proven expedient if the address computer is so designed that first a variation of the allocation of the image point data in the horizontal direction is effected until a minimum difference results, and if, as the second step, the alteration is effected in the vertical direction. A fluoroscopic subtraction can take place if the image storage means is comprised of an image storage having its output connected with one input of the difference stage and if the current video signal of the television pickup system is supplied to a second input of the difference stage. A subtraction of two picture records can be achieved if the image storage means is comprised of two image storages which are connected with the difference stage.

The invention shall be explained in greater detail in the following on the basis of exemplary embodiments illustrated on the accompanying drawing sheet; and other ojects, features and advantages will be apparent from this detailed disclosure and from the appended claims.

DETAILED DESCRIPTION

Figure 1:
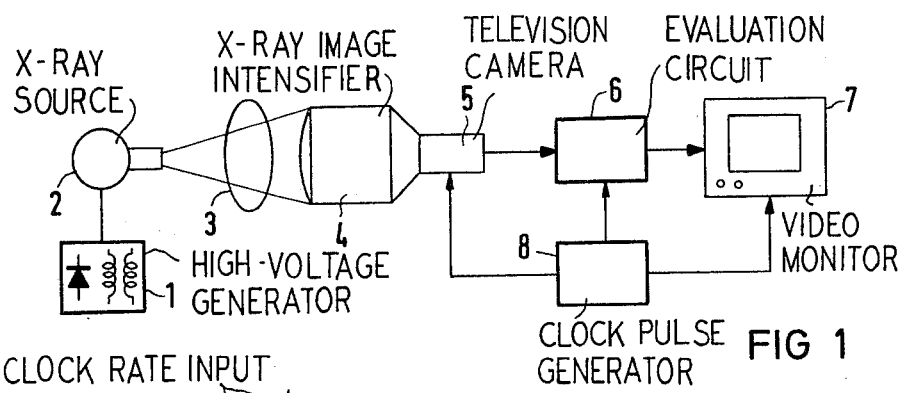
FIG. 1 illustrates a block circuit diagram of a diagnostic x-ray installation.

In FIG. 1, a diagnostic x-ray installation comprising an x-ray tube 2, fed by a high voltage generator 1, is illustrated, in whose ray path a patient 3 is disposed. An x-ray image intensifier 4, following in the ray path, is connected with a television camera 5 whose output is supplied to an evaluation circuit 6. The signal processed therein is displayed on a monitor 7. A synchronous clock pulse generator 8 controls the synchronization of the chronological functional sequences of the television camera 5, the evaluation circuit 6 and the monitor 7.

Figure 2:
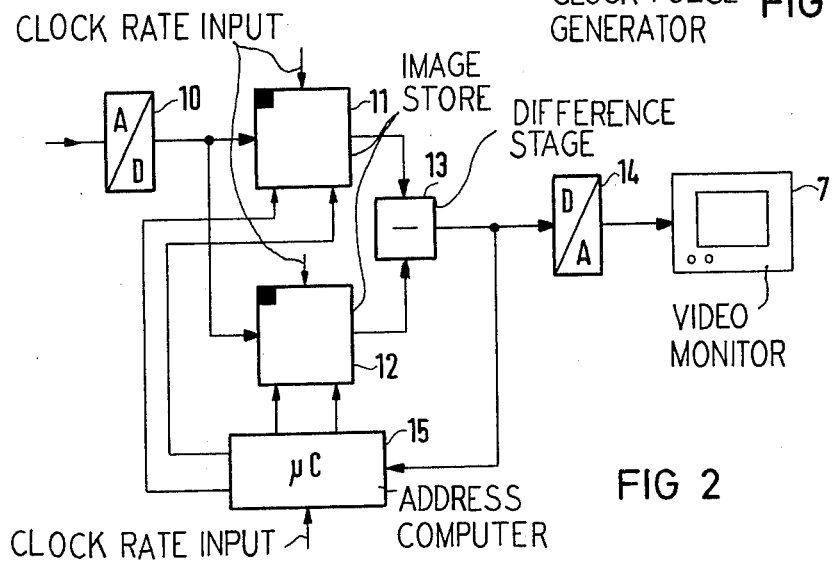
FIGS. 2 and 3 illustrate block circuit diagrams of the evaluation circuit according to FIG. 1.

Supplied to the evaluation circuit 6 illustrated in FIG. 2 is the video signal of the television camera 5, which is separated into digital image points in an analog-to-digital converter (A/D-converter) 10. The output of the A/D-converter 10 is connected with two image storage units 11 and 12 whose functions are controlled by the synchronous clock pulse generator 8. The outputs of the image storage units 11 and 12 are connected with a difference stage 13 in which the stored video signals are subtracted from one another. The difference signal is converted in a digital-to-analog converter (D/A-converter) 14 into analog video signals and is displayed on the monitor 7.

The output of the difference stage 13 is further connected to an address computer 15 whose outputs are connected with the address inputs of the image storage units 11 and 12. The clock pulse rate of the synchronous clock pulse generator 8 is also supplied to the latter. The address computer 15 effects an allocation of the image points of the stored images during the subtraction. In the address computer 15, the sum of the amount of the differences of the image points of a television image is computed. This sum is intermediately stored. During the rendition of the next television image the address computer 15 determines the allocation of the image points in such a fashion that the two images are slightly horizontally offset. Also now it forms the sum of all differences and compares them with the preceding stored sum. If the preceding difference sum was greater than the newly computed sum, then it shifts the image further in this direction. However, if the first sum is smaller, then it shifts the images in the other horizontal direction. This proceeds until a minimum difference results. Subsequently, such a shift of the allocation of the image points also proceeds in the vertical direction, likewise until again a minimum difference results; i.e., the images now correspond so that they are in coincidence.

Figure 3:
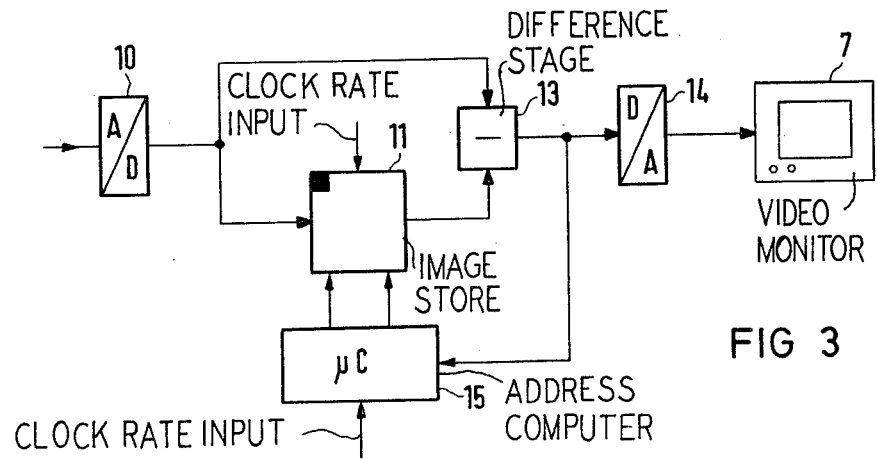

In FIG. 3, a simplified design is illustrated which can be employed in the case of flouroscopy subtraction. Instead of the two image storage units 11 and 12, in which successive image data with and without contrast medium filling are stored, only one image storage unit 11 is employed into which the image with contrast medium filling was read. There is supplied to the difference stage 13, in addition to the video signal of the image storage 11, the output signal of the television camera 5, which has been converted in the A/D-converter 10, which output signal is obtained during an x-ray fluoroscopy. Through displacement of the allocation of the image points in the image storage 11 relative to the image points supplied by the television camera 5, an automatic coincidence adjustment of the stored picture record to the current fluoroscopy image takes place.

The address computer 15 can be constructed as a microcomputer which, for example, is comprised of a microprocessor for calculating the sum of the signals delivered by the difference stage 13, for the comparison of the sum with the preceding sum and for the determination of the addresses for the image storage units 11 and 12, of a program memory, of data storage means for the intermediate storage of the values computed by the microprocessor, and of output registers for supplying the addresses determined by the microprocessor.

Instead of the electronic image storage illustrated in the Figures, also the photographic image storage means which are taekn by television cameras, mentioned at the outset, can be employed. For example, two picture records can here be synchronously scanned by one television camera each, whose output signals are supplied to the difference stage. A displacement of the allocation of the image points can proceed in that the video signals are shifted relative to one another. However, also only one television camera can be provided which reads the one picture record, as described in FIG. 3, into an electronic image storage, subsequently picks up the second picture record and directly supplies the video signals to the difference stage 13.

It will be apparent that many modifications and variations may be effected without departing from the scope of the novel concepts and teachings of the present invention.

We claim as our invention:

1. The method of producing a resultant image from sets of image point data representing successive images of a patient obtained by means of a patient diagnostic installation including an image point memory, said method comprising (a) obtaining a first image of a body region of a patient prior to filling with a contrast medium, and obtaining a second image of the body region after filling with the contrast medium, (b) storing at least the first image as a set of image point data in the image point memory, (c) forming the difference between the first and second images by the subtraction of the respective image point data of the first and second images for a case representing an original superposition relationship between the first and second images, and effecting a summation of the difference image point data, (d) repeating step (c) with an offset relationship of the respective image point data being subtracted such that further difference image point data is obtained for the case where the first and second images are offset in comparison to their original superposition relationship during step (c), and effecting a summation of the further difference image point data, (e) repeating step (d) with successively different offset relationships of the respective image point data being subtracted, and obtaining respective summation values for the respective different offset relationships, (f) comparing the respective summation values obtained in step (e), and selecting the offset relationship of the first and second images giving the minimum summation value, and (g) displaying the difference image point data corresponding to the selected offset relationship as the desired resultant image.

2. The method according to claim 1, wherein steps (d) and (e) are carried out by firstly successively offsetting respective lines of image point data of the first image relative to respective lines of image point data of the second image so that difference image point data is obtained for the case where the first and second images are successively offset in a horizontal line scan direction, whereupon step (f) is carried out to determine the offset in the horizontal line scan direction which gives the minimum summation value, step (e) then being carried out by successively offsetting the image point data of the first and second images so that difference image point data is obtained for the case where the first and second images are successively offset in a vertical scan direction at right angles to the horizontal line scan direction, step (f) thereafter being carried out to determine the offset in the vertical direction which gives the minimum summation value.

3. An x-ray diagnostic installation comprising a television pick-up system, image point storage means having address inputs for selecting image point data to be read out, a difference stage having input means connected to said image point storage means and effecting the subtraction of two sets of chronologically successively obtained image point data through difference formation, and a monitor, characterized in that, for the offsetting of the image point data to be compared, respectively, in the difference stage, an address computer is connected with the output of the difference stage, and has outputs connected to the address inputs of the image point storage means.

* * * * *